(12) United States Patent
 Lloyd

(10) Patent No.: US 11,471,743 B2
(45) Date of Patent: Oct. 18, 2022

(54) SPORTS EQUIPMENT COMPRISING A GUY LINE AND A MEASURING APPARATUS FASTENED TO THE GUY LINE

(71) Applicant: REUTHER GYMNASTICS B.V., Helmond (NL)

(72) Inventor: Alberts Lloyd, Helmond (NL)

(73) Assignee: JFS B.V., Helmond (NL)

( * ) Notice: Subject to any disclaimer, the term of this patent is extended or adjusted under 35 U.S.C. 154(b) by 777 days.

(21) Appl. No.: 16/397,491

(22) Filed: Apr. 29, 2019

(65) Prior Publication Data

US 2019/0329117 A1    Oct. 31, 2019

(30) Foreign Application Priority Data

Apr. 30, 2018 (FR) ...................... 1800403

(51) Int. Cl.
| | | |
|---|---|---|
| A63B 71/02 | (2006.01) | |
| A63B 1/00 | (2006.01) | |
| A63B 24/00 | (2006.01) | |
| A63B 71/06 | (2006.01) | |
| G01L 5/103 | (2020.01) | |

(52) U.S. Cl.
CPC ............ *A63B 71/021* (2013.01); *A63B 1/005* (2013.01); *A63B 24/0062* (2013.01); *A63B 71/0622* (2013.01); *G01L 5/103* (2013.01); *A63B 2220/58* (2013.01); *A63B 2220/833* (2013.01); *A63B 2225/52* (2013.01)

(58) Field of Classification Search
CPC ... A63B 71/021; A63B 1/005; A63B 24/0062; A63B 71/0622; A63B 2220/58; A63B 2220/833; A63B 2225/52; A63B 2071/0625; A63B 2220/51; A63B 2225/50; A63B 3/00; A63B 1/00; A63B 2071/0694; A63B 71/06; A63B 71/0619; A63B 2071/063; A63B 2225/02; G01L 5/103

See application file for complete search history.

(56) References Cited

U.S. PATENT DOCUMENTS 3,466,024 A    9/1969  Spieth
4,687,194 A    8/1987  Good et al.
(Continued)

FOREIGN PATENT DOCUMENTS

| CA | 2917368 A1 | 7/2017 |
| GB | 1403132 A | 8/1975 |
| WO | 2005/075286 A1 | 8/2005 |

OTHER PUBLICATIONS

FR Search Report, dated Nov. 22, 2018, from corresponding FR application No. 1800403.

*Primary Examiner* — Francis C Gray
(74) *Attorney, Agent, or Firm* — Nixon & Vanderhye

(57) ABSTRACT

An item of sports equipment includes a guy line to which is applied a mechanical tension and which ensures the stability or the rigidity of the item of sports equipment. The sports equipment includes a measuring apparatus which is fastened to the guy line such that the guy line tension is applied to it, the measuring apparatus including a sensor adapted to deliver an electrical signal corresponding to representational information on the guy line tension. The measuring apparatus is fastened to the guy line all the time, making it possible to obtain representational information on the guy line tension at any instant.

20 Claims, 3 Drawing Sheets

(56) References Cited

U.S. PATENT DOCUMENTS

| | | | |
|---|---|---|---|
| 7,313,975 B1 * | 1/2008 | Scorteanu | G01L 5/103 |
| | | | 254/257 |
| 7,478,563 B2 * | 1/2009 | Weisman | G01L 5/042 |
| | | | 73/833 |
| 8,806,952 B1 * | 8/2014 | Glass | A63B 61/02 |
| | | | 73/826 |
| 9,617,752 B2 * | 4/2017 | Wagner | E02D 27/425 |
| 10,816,420 B1 * | 10/2020 | Litteken | G01L 5/102 |
| 11,079,292 B2 * | 8/2021 | Lisiak | B66C 1/12 |
| 2007/0022675 A1 * | 2/2007 | Weisman | G01L 5/042 |
| | | | 52/146 |
| 2016/0199697 A1 * | 7/2016 | Orfield | A63B 21/151 |
| | | | 482/8 |
| 2019/0016565 A1 | 1/2019 | Hillgardner | |

* cited by examiner

SPORTS EQUIPMENT COMPRISING A GUY LINE AND A MEASURING APPARATUS FASTENED TO THE GUY LINE

BACKGROUND OF THE INVENTION

Field of the Invention

The present invention relates to the field of equipment for carrying out a sport. It relates in particular to gymnastics apparatus. It applies in particular to sports equipment of which the stability or the rigidity is provided with the aid of one or more guy lines tensioned between said apparatus and a fixed point, for example on the ground or between the parts of said equipment.

More particularly, the present invention concerns an item of sports equipment comprising a guy line to which is fastened a measuring apparatus.

By sports equipment is meant any installation configured for carrying out sport.

Description of the Related Art

Conventionally, certain items of sports equipment comprise guy lines able to have various functions. The guy lines may be used in order to provide stability between different members of the sports equipment but also in order to ensure anchorage of the sports equipment to the ground.

The term guy line generally designates a cable, a chain or a rope placed in tension and enabling a device to be held and strengthened.

Whatever the function played by the guy line in the sports equipment, it is important to ensure it is properly tensioned. This is because the guy line has an impact on the equilibrium and the stability of the sports equipment and therefore on the safety of the user.

By tension of the guy line is meant the tensile stress it undergoes when it is subjected at its ends to two forces directed in its extension direction outwardly, that is to say tending to stretch said guy line. It is generally expressed in newtons (N).

Tension checking devices are known from the prior art which can be disposed on the surface of the guy line of the sports equipment in order to measure the tension and which are then removed once the measurement has been made. This has the disadvantage of being painstaking and of not enabling checking of the guy line tension at any time. The safety of the user is thus not always guaranteed. Furthermore, if the checking device has too great a mass, this may lead to inaccuracy in the guy line tension measurement.

Moreover, in addition to the safety aspect, the user of the sports equipment may wish to modify the guy line tension at will for example according to the exercise carried out or the objective sought. As a matter of fact, the tension applied in the guy lines modifies the dynamic response of the equipment, and thus the user's perception during an exercise. Furthermore, it may be desirable to adapt the tension to the user's morphology in a reliable manner. However, the devices of the prior art make the checking of the tension painstaking and complicated to implement, in particular when the user frequently needs to modify the guy line tension or when several users use the equipment in turn.

A simple solution enabling representational information on the guy line tension to be obtained simply, quickly and accurately is thus desirable.

BRIEF SUMMARY OF THE INVENTION

The present invention is directed to solving at least one of the aforesaid drawbacks.

Thus, the invention concerns an item of sports equipment comprising a guy line to which is applied a mechanical tension and which ensures the stability or the rigidity of the item of sports equipment. According to the invention, the item of sports equipment comprises a measuring apparatus which is fastened to the guy line such that the guy line tension is applied to it, the measuring apparatus comprising a sensor adapted to deliver an electrical signal corresponding to representational information on the guy line tension.

As the measuring apparatus is fastened to the guy line all the time, this makes it possible to obtain representational information on the guy line tension at any instant. This thus enables the user to modify the guy line tension at will while ensuring he or she is safe. Furthermore, since the tension is applied to the measuring apparatus, in that the tensile force of the guy line applies directly to the measuring apparatus, the latter is able to provide reliable information on said tension.

The measuring apparatus may comprise a display configured to indicate the representational information on the tension of the guy line.

The display so integrated into the measuring apparatus enables the user rapidly to obtain the representational information on the guy line tension.

The measuring apparatus may comprise a connection port enabling the connection of a display configured to indicate the representational information on the tension of the guy line.

The measuring apparatus may comprise a system for wireless transmission to a display of the representational information on the tension of the guy line.

The sports equipment may comprise a display communicating with the measuring apparatus so as to indicate the representational information on the tension.

The formation of a connection port and the integration of a wireless transmission system greatly increase the possibilities for display types that can be used with the measuring apparatus. This thus enables the user to have a measuring apparatus that is configured and configurable to his or her need, for example according to the type of representational information on the tension he or she wishes to obtain.

The wireless transmission system may also enable the displaying of information for several measuring apparatuses simultaneously or alternately on a same display.

The display may be configured to provide a numerical value of the tension of the guy line.

The measuring apparatus may comprise a data storage device configured to store the representational information on the tension of the guy line.

The storage of the representational information enables the user to later exploit the measured data for example for statistical purposes or to ensure proper anchoring of the guy line.

The measuring apparatus may comprise a warning device configured to emit a warning signal when the value of the tension of the guy line goes outside a predefined range.

The warning signal, which may for example be visible or audible, constitutes for the user a warning means that can be rapidly detected when the guy line tension goes outside a predefined range. According to criteria for defining the tension range, this feature may enable the safety of the user to be ensured or quite simply to provide the comfort in use he or she seeks.

The measuring apparatus may comprise at least one battery enabling its operation, the measuring apparatus comprising a light-emitting diode configured to indicate the state of said at least one battery.

The light-emitting diode constitutes a signal rapidly noticeable by the user thereby avoiding the latter having to regularly check the state of the battery of the measuring apparatus.

The invention also relates to an item of sports equipment comprising several guy lines and comprising a measuring apparatus, such as described above, for each guy line.

Still other particularities and advantages of the invention will appear in the following description.

BRIEF DESCRIPTION OF THE DRAWINGS

In the accompanying drawings, given by way of non-limiting example.

DETAILED DESCRIPTION OF THE PREFERRED EMBODIMENTS

Figure 1:
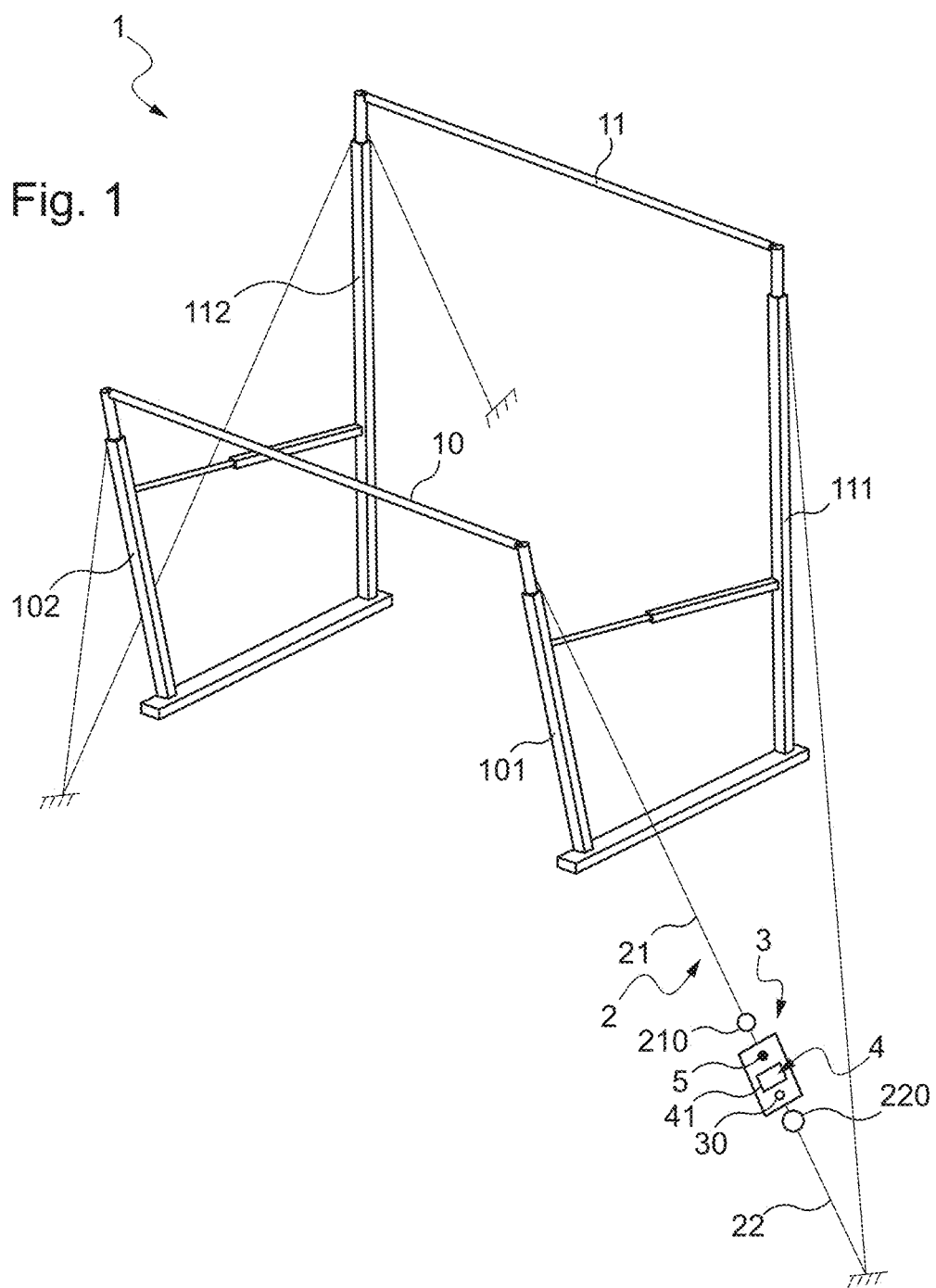
FIG. 1 represents a view of uneven bars provided with guy lines and comprising a measuring apparatus fastened to one of the guy lines, thus constituting an item of sports equipment according to an embodiment of the invention.

FIG. 1 represents an item of sports equipment 1, i.e. gymnastics uneven bars, comprising guy lines. Of course, the present invention implemented for uneven bars is still valid for any other type of sports equipment provided with at least one guy line.

The uneven bars 1 here comprise a lower bar 10 and an upper bar 11. Two lower uprights 101, 102 and two upper uprights 111, 112 are respectively disposed on opposite sides of the lower bar 10 and of the upper bar 11. The lower and upper uprights enable the lower bar 10 and upper bar 11 to be supported.

In order to ensure the stability and proper anchorage to the ground of the uneven bars 1, guy lines are attached to the lower uprights 101, 102 and to the upper uprights 111, 112. Of course, the uneven bars 1 may be provided with guy lines disposed in other configurations.

The following portion of description is made relative to the guy line 2 attached to the lower upright 101.

The measuring apparatus 3 is fastened to the guy line 2. The measuring apparatus 3 is configured to deliver information relative to the guy line tension. The information delivered may be any representational information about the guy line tension. This is information relevant to the objective of assisting the user of the sports equipment in doing his or her sport. The representational information may thus be the exact value of the guy line tension, an item of information about the fact that the value of the tension is included in a predefined range, an indication of the state of the guy line tension (taut, slack), an indication as to the anchorage and/or the stability of the sports equipment, or any other information about the tension in the guy line.

Of course, the use of the singular "item of representational information" must not be understood restrictively since the measuring apparatus 3 may deliver several items of information on the guy line tension simultaneously or successively.

According to the illustrated example embodiment, the guy line 2 comprises a first part 21 and a second part 22. The first part 21 and the second part 22 respectively comprise at one of their ends a first attachment point 210 and a second attachment point 220. The measuring apparatus 3 is fastened to the first part 21 of the guy line 2 at the location of the first attachment point 210, and is furthermore fastened to the second part 22 of the guy line 2 at the location of the second attachment point 220. The guy line tension 2 is applied to the measuring apparatus 3. In other words, the measuring apparatus 3 has directly applied to it the tensile force, or tension, applied by the guy line 2 to the sports equipment.

Compared with the measuring apparatuses known in the prior art which are disposed on the guy line, the measuring apparatus 3 can be rapidly used at any time and for any sort of sports equipment comprising a guy line. By way of example, the measuring apparatus 3 may be used for an item sports equipment having guy lines covered by a sheath, without the measurement accuracy being affected by the presence of the sheath. As a matter of fact, since the measuring apparatus 3 is not disposed on the sheathed guy line but instead anchored to the latter so that the guy line tension is applied directly to it and in totality, the tension measurements may be made without this having any effect on the accuracy of the measurements.

The measuring apparatus 3 may of course be fastened in another way to the guy line 2. By way of example, the guy line 2 may be constituted by a single part and the measuring apparatus is then fastened to one end of the guy line. Thus, the measuring apparatus may be fastened both to the guy line and to an anchor, or fixed point, enabling anchorage of the guy line to the ground. Alternatively, the measuring apparatus may be attached both to the guy line 2, and to the lower upright 101 (or, more generally, directly to a point of linkage with the sports equipment).

The measuring apparatus 3 comprises a sensor adapted to deliver an unprocessed electrical signal representational of the guy line tension 2. On a non-limiting basis, the electrical signal comprises a certain number of physical quantities of which the value or the variation may express the guy line tension, in particular: an electrical voltage, an electrical current or a frequency variation if the signal is not continuous.

For an electronic measuring apparatus as illustrated in the embodiments of the drawings, the sensor (not shown) may be a force sensor configured to express the guy line tension as an electrical signal. The force sensor may be a strain gauge. The unprocessed electrical signal from the sensor may be acquired by a microcontroller or any other processing device configured to read said unprocessed electrical signal from the force sensor in order to generate an output signal. The output signal corresponds to the representational information on the guy line tension. In order to simplify the processing of the signal, a conditioner may be used between the force sensor and the processing device.

The electronic character of the device enables a compact measuring apparatus to be obtained. Indeed, compared with a mechanical measuring apparatus generally requiring the use of parts such as springs of which the length changes according to the tension applied to them, the measuring apparatus 3 is compact and not only has small dimensions but also dimensions that do not change whatever the mechanical tension applied to it. The measuring apparatus 3 is thus of low volume and low cumbrousness.

Furthermore, as the measuring apparatus 3 is an electronic apparatus, that is to say having a sensor configured to deliver an electrical signal, the representational information may be more accurate compared with a mechanical measuring apparatus.

The device represented here comprises a display 4 configured to receive the output signal corresponding to the information relative to the tension in the guy line, and to indicate that representational information on the guy line tension 2. By "display" is meant any means making it possible to display the information on the guy line tension, in particular in accordance with the examples mentioned below.

Figure 2:
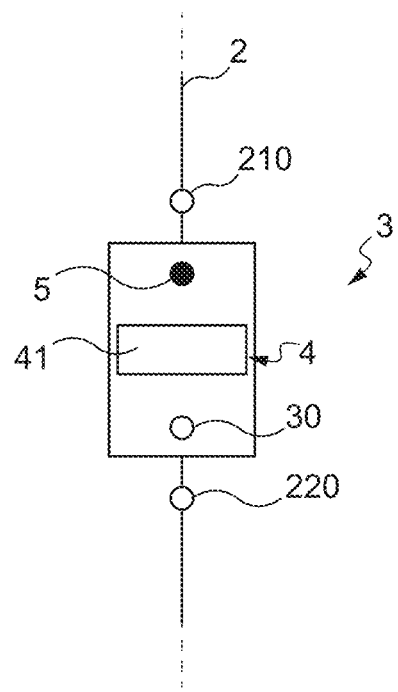
FIG. 2 represents a detail view of the measuring apparatus of FIG. 1.

As can be seen in FIG. 2, the measuring apparatus 3 comprises, in the embodiment represented here, a button 30. The button 30 here is an on/off button configured to turn the measuring apparatus 3 on and off. When the button 30 is engaged, the sensor, the microcontroller and the display are on and the guy line tension may be measured then displayed at least for a certain time.

According to the example embodiment illustrated in FIGS. 1 and 2, the display 4 is integrated into the measuring apparatus 3. The display 4 here comprises a screen 41 configured to display the representational information on the guy line tension 2. The displayed information may be a numerical value, an indication of state such as "taut" or "slack", a code signifying to the user that the guy line is sufficiently taut or insufficiently taut relative to a standard or relative to a prior setting by the user, a color having a signification (for example green for a guy line properly tensioned, orange for a low or high tension, red for an insufficiently or excessively tensioned guy line), a graphical representation of the tension within an allowable range of tension, etc. The screen 41 is preferably of sufficiently large size to enable simple and rapid reading of the information on the guy line tension 2.

The electronic character of the device makes it possible to obtain by the same measuring apparatus a high diversity in the type of representational information delivered, for example, the measurement of the guy line tension, the tension state (for example properly tensioned, not tensioned enough) of the guy line 2, etc.

Furthermore, the measuring apparatus 3 is ergonomic since the user obtains representational information on the display that is relevant and able to be immediately interpreted. By "able to be interpreted" is meant information that can be interpreted without requiring calculation or advanced evaluation by the user (which is often necessary with mechanical measuring apparatuses), in addition to merely reading the representational information.

Of course, several alternatives may be envisioned for the display 4. The display may be a needle-and-dial or a digital display such as a fluorescent display, or one with segments, with light emitting diodes, etc.

Figure 3:
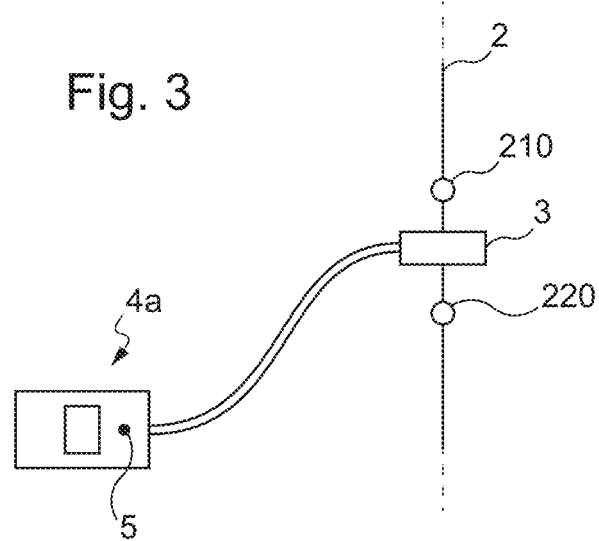
FIG. 3 represents a detail view, similar to that of FIG. 2, of the measuring apparatus according to another embodiment of the invention.

FIG. 3 illustrates a second embodiment in accordance with the invention. In this example embodiment, the measuring apparatus 3 comprises a connection port to which a display 4a is configured to be connected.

The display 4a may be a conventional display such as those cited for the display 4 integrated with the measuring apparatus. Alternatively, the display 4a may be an electronic device such as a mobile apparatus of smartphone type or a tablet. If several guy lines of a same item of sports equipment, or of several items of sports equipment, are equipped with a tension measuring apparatus, this enables reading of the tension in each guy line by successive connections to said measuring apparatuses. The compactness and discretion of the assembly are improved, and the total cost of the equipment for the guy lines is reduced.

According to another embodiment which may be alternative or complementary to the embodiments described earlier, the measuring apparatus 3 comprises a wireless transmission system.

Figure 4:
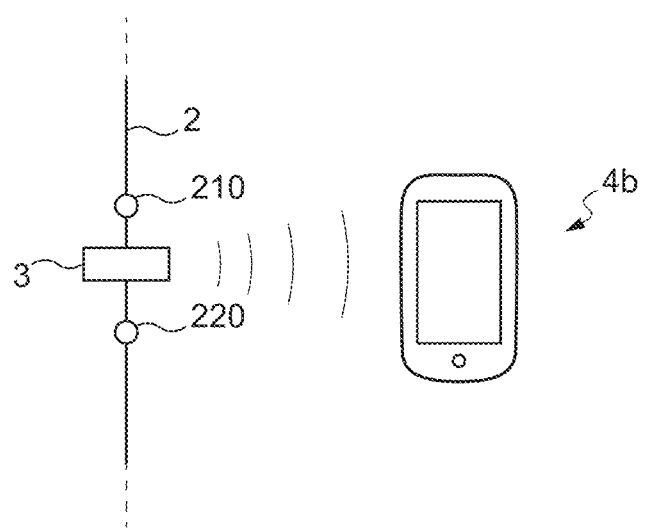
FIG. 4 represents a detail view, similar to that of FIGS. 2 and 3, of the measuring apparatus according to another embodiment of the invention.

FIG. 4 represents an embodiment in which the communication between the measuring apparatus 3 and a display 4b is made solely via a wireless network. The wireless transmission system is configured to transmit the representational information on the guy line tension 2 to a display 4b. By wireless transmission system is meant any system for communication at a distance using for example known technologies such as Bluetooth™, ZigBee™, Wi-Fi™, or any other suitable wireless communication protocol.

The display 4b comprises corresponding reception means, enabling it to acquire the representational information on the guy line tension 2 coming from one or more measuring apparatuses.

Just as in the context of the wired communication of the embodiment of FIG. 3, the communication may be bi-directional, in that the display may transmit parameterization information to the measuring apparatus. The parameterization may comprise the definition of an allowable tension range.

The display 4b may be a dedicated device or a mobile apparatus such as a tablet (as in the example represented in FIG. 4), a computer or a smartphone. The device is controlled by the user who may parameterize it for example via a software application.

Whatever the mode of display and communication between the measuring apparatus 3 and the display 4, the device may allow the user the possibility of choosing a preferred tension range or even a preferred tension, choose an error margin for the preferred tension range or for the preferred tension before setting off a warning signal, including a reference tension that depends for example on a standard, choose the unit for reading the tension, etc. To that end, the device may be provided with commands, such as a slider or a rotary button on the measuring apparatus, or with physical or virtual commands on the display.

Furthermore, several displays 4, 4a, 4b of different type communicating differently with the measuring apparatus (connection port, wireless transmission, integrated display) may be used for the same guy line. In this case, the items of representational information indicated by the displays may be similar or different and may be simultaneously or successively indicated.

For an electronic measuring apparatus 3, at least one energy source is required for its operation. A battery in particular may be employed. A supply port is thus provided to supply said battery with electricity. The measuring apparatus 3 thus has an autonomy linked to the capacity of the battery, enabling it to operate without being continuously supplied with electric current.

According to the example embodiment illustrated in FIG. 2, the display 4a comprises a light-emitting diode 5. The light-emitting diode 5 is suited to indicate the state of the battery of the measuring apparatus 3. When the battery drops below a certain threshold, for example 10%, the light-emitting diode turns on to indicate to the user that he or she must recharge the measuring apparatus 3. When the battery reaches a very low threshold, for example 2% the light-emitting diode flashes. Of course, according to the display technology employed, the low battery charge information may be indicated in various ways: the appearance of a pictogram, a visible indicator such as a color, the triggering of an audible signal if the display or the measuring apparatus is provided with an audio emitting device. Furthermore, when the display used is for example a smartphone or a tablet, information on the level of battery charge may be indicated directly on the screen of the display for example by the indication of a percentage or by means of an icon displaying the level of charge as well as the maximum autonomy for example. The indication of the information on the level of charge on the screen of the display may be made in addition to a low charge indication means as described above.

The sports equipment of the invention may comprise data storage devices (not shown), comprising an electronic memory, configured to store the representational information on the guy line tension 2. This enables the information on the guy line tension to be kept in memory, making it possible to consult that information later.

The data storage devices may be either integrated into the measuring apparatus, or be included in the display, for example in devices able to be associated with the measuring apparatus such as a computer, a smartphone or a tablet.

It is thus for example possible to keep in memory the guy line tension 2 in order to be able to evaluate over time the change in state of the guy line 2 and thus decide for example upon its replacement. The storage of data on the guy line tension may also be used for statistical purposes, for example to evaluate the length of life of a guy line.

Generally, a device for display and/or for data processing may have a wired or wireless connection with the measuring apparatus. The data relative to the guy line tension may thus be processed, displayed, stored, shared etc. The data may be combined. They may be displayed in various ways.

The measuring apparatus used in the invention enables different types of information to be delivered according to the user's wishes. The use of dedicated devices and in particular software applications that are programmable gives flexibility to the user. This makes it possible to obtain information that is relevant and configurable to the requirement of each user.

The present description is made for a measuring apparatus fastened to a guy line. Of course, for an item of sports equipment comprising several guy lines, a measuring apparatus may be fastened to each guy line.

In case of respective fastening of several measuring apparatuses to several guy lines, a common display may be used for all the measuring apparatuses. The common display may have a wired link to the measuring apparatuses, or be linked via a wireless communication system. The user has the possibility for example to select a particular guy line for which he or she wishes to obtain the tension. The common display also makes it possible to select several guy lines and thus compare the different tensions. The display may comprise an interface which represents, on a single screen, the tension of the different guy lines that are equipped.

The sharing of information with devices such as a dedicated display or another electronic device is particularly advantageous if the stability of the equipment is checked by a third party, other than the user, for example a person whose function it is to check all the equipment of a sporting premises. This makes it possible to make fast and reliable measurements and verifications.

Naturally, the present invention is not limited to the embodiments described above. In particular, the functionalities of the measuring apparatus in particular linked to the displays and dedicated devices are not limited to those described earlier.

By way of non-limiting examples, the measuring apparatus may comprise a warning device configured to emit a warning signal when the value of the tension of the guy line goes outside a predefined range. The predefined range is for example chosen by the user or set by default to values determined by a standard. The predefined range depends for example on the arrangement of the guy lines.

The warning signal may be an audible or visible signal. Thus, a light-emitting diode which turns on or an audible beep may for example warn the user when the guy line tension goes outside the predefined range. The warning signal may be an electronic signal sent to the display (integrated, or wired or wirelessly linked), such that the display emits a visible or audible signal.

In order to save battery for the measuring apparatus, the latter may switch off automatically after a certain time has elapsed, for example of the order of thirty seconds after having displayed the value of the guy line tension.

The invention is illustrated by an item of sports equipment, i.e. uneven bars, linked to the ground or to fixed points such as ballast weights (e.g. concrete or metal posts) laid on the ground. Guy lines may also be employed to ensure the rigidity of an item of sports equipment, by linking different points of said member. For example, guy lines may avoid excessive deformation of members constituting said item of sports equipment.

On a non-limiting basis, there may be listed among the sports equipment to which the invention may be applied: gymnastics apparatuses (parallel bars, uneven bars, a gantry for still rings, a pommel horse, a vault), athletics jumping equipment, equipment for certain team sports (basketball baskets, volleyball nets, tennis nets) or any other sports equipment of which the dimensions or the constitution require the use of guy lines.

The invention thus provides sports equipment comprising at least one guy line and a measuring apparatus enabling representational information on the guy line tension to be delivered simply and rapidly.

The measuring apparatus so developed is light-weight, which enables it to be fastened to the guy line without distorting the tension measurements and without significantly influencing the dynamic behavior of the sports apparatus equipped therewith. The electronic measuring apparatus employed in the invention may have small dimensions as well as a very low mass, unable to interfere with the mechanical response of the guy lines.

The present invention is also particularly advantageous for sports persons wishing to reproduce particular exercise conditions, for example to exercise several times under the same conditions, that is to say by adjusting the tension of the guy lines such that it is always the same. The user of an item of sports equipment in accordance with the invention may in particular be associated with a user profile comprising the tension values desired in the guy lines, so as to adjust those tensions in accordance with said profile.

The present invention is also particularly advantageous for gymnastics equipment having guy lines for which it is important to maintain the tension of the guy lines allowing training suitable for gymnasts while ensuring their safety.

On account of the electronic nature of the measuring apparatus, numerous services may be offered by an item of sports equipment in accordance with the invention: storage in memory of the measurements made, definition of user profiles, possibility of frequently, rapidly and reliably checking the items of equipment comprising the measuring apparatus, possibility of display being carried out remotely or even shared for several sensors, low cost of implementation.

The invention claimed is:

1. An item of sports equipment comprising:
   a guy line to which is applied a mechanical tension and which ensures the stability or the rigidity of said item of sports equipment; and
   a measuring apparatus which is fastened to said guy line such that the guy line tension is applied to the measuring apparatus, said measuring apparatus comprising a sensor configured to deliver an electrical signal corresponding to representational information on the guy line tension.

2. The item of sports equipment according to claim 1, wherein the measuring apparatus further comprises a display configured to indicate said representational information on the tension of the guy line.

3. The item of sports equipment according to claim 1, wherein the measuring apparatus further comprises a connection port enabling the connection of a display configured to indicate the representational information on the tension of the guy line.

4. The item of sports equipment according to claim 1, wherein the measuring apparatus further comprises a system for wireless transmission to a display of the representational information on the tension of the guy line.

5. The item of sports equipment according to claim 3, further comprising the display communicating with the measuring apparatus to indicate the representational information on the tension.

6. The item of sports equipment according to claim 2, wherein the display is configured to provide a numerical value of the tension of the guy line.

7. The item of sports equipment according to claim 1, wherein said measuring apparatus further comprises a data storage configured to store said representational information on the tension of the guy line.

8. The item of sports equipment according to claim 1, wherein said measuring apparatus further comprises a warning device configured to emit a warning signal when the value of the tension of the guy line goes outside a predefined range.

9. The item of sports equipment according to claim 1, wherein the measuring apparatus further comprises
   at least one battery enabling operation of the measuring apparatus, and
   a light-emitting diode configured to indicate a state of said at least one battery.

10. The item of sports equipment according to claim 1, further comprising a plurality of guy lines, each of the guy lines including a respective measuring apparatus.

11. The item of sports equipment according to claim 2, wherein the measuring apparatus further comprises a connection port enabling the connection of a display configured to indicate the representational information on the tension of the guy line.

12. The item of sports equipment according to claim 2, wherein the measuring apparatus further comprises a system for wireless transmission to a display of the representational information on the tension of the guy line.

13. The item of sports equipment according to claim 3, wherein the measuring apparatus further comprises a system for wireless transmission to a display of the representational information on the tension of the guy line.

14. The item of sports equipment according to claim 4, further comprising the display communicating with the measuring apparatus to indicate the representational information on the tension.

15. The item of sports equipment according to claim 5, wherein the display is configured to provide a numerical value of the tension of the guy line.

16. The item of sports equipment according to claim 2, wherein said measuring apparatus further comprises a data storage configured to store said representational information on the tension of the guy line.

17. The item of sports equipment according to claim 3, wherein said measuring apparatus further comprises a data storage configured to store said representational information on the tension of the guy line.

18. The item of sports equipment according to claim 4, wherein said measuring apparatus further comprises a data storage configured to store said representational information on the tension of the guy line.

19. The item of sports equipment according to claim 5, wherein said measuring apparatus further comprises a data storage configured to store said representational information on the tension of the guy line.

20. The item of sports equipment according to claim 6, wherein said measuring apparatus further comprises a data storage configured to store said representational information on the tension of the guy line.

* * * * *